Aug. 14, 1923.

C. W. TERRY 1,464,514

BATTERY TESTING INSTRUMENT

Filed Oct. 31, 1919

Inventor
Charles W. Terry

By Whittemore Hulbert & Whittemore
Attorneys

Patented Aug. 14, 1923.

1,464,514

UNITED STATES PATENT OFFICE.

CHARLES W. TERRY, OF DETROIT, MICHIGAN, ASSIGNOR TO SERVICE STATION SUPPLY COMPANY, OF DETROIT, MICHIGAN, A CORPORATION OF MICHIGAN.

BATTERY-TESTING INSTRUMENT.

Application filed October 31, 1919. Serial No. 334,698.

*To all whom it may concern:*

Be it known that I, CHARLES W. TERRY, a citizen of the United States of America, residing at Detroit, in the county of Wayne and State of Michigan, have invented certain new and useful Improvements in Battery-Testing Instruments, of which the following is a specification, reference being had therein to the accompanying drawings.

The invention relates to instruments designed for the testing of storage batteries and more particularly to indicate an abnormal condition in any of the cells. It is the object of the invention to obtain a portable instrument which can be easily manipulated in the testing of the batteries and which has various advantages as hereinafter set forth.

Figure 1:
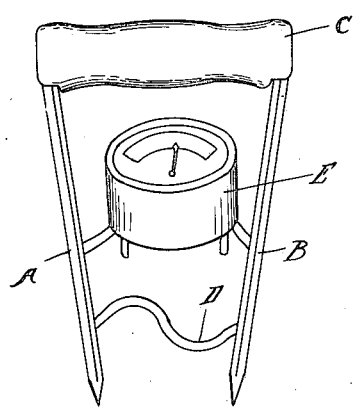
Figure 1 is a perspective view of the instrument.
Figure 2:
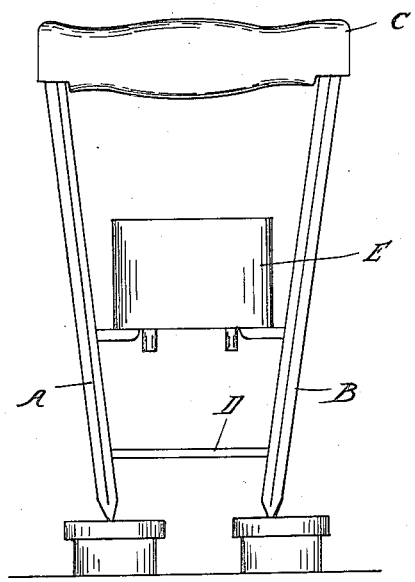
Figure 2 is a front elevation thereof having engagement with a battery which is being tested.

In the present state of the art one method of testing batteries for the indication of trouble or defects therein is to connect into circuit between the poles of the battery a known resistance having a voltmeter in shunt therewith. Usually the voltmeter and resistor are located in permanent position and are coupled with a battery through flexible connectors having prods at their ends which may be pressed into the soft metal battery terminals. To simplify the construction and to facilitate the testing operation I have devised a self-contained instrument in which the voltmeter, resistor and prods are in fixed relation to each other and to a handle for manipulation. The spacing of the prods is such that they may be simultaneously engaged with battery terminals, and the handle forms a convenient means for manipulation. Also the voltmeter is so located that it may be read by the operator while the prods are held upon the terminals.

In detail, and as shown in the drawings, A and B are prods having sharpened points at their lower ends and which at their upper ends are mechanically secured to a transversely extending handle C. The prods are insulated from each other at the handle, but are cross connected by the resistor D and a shunt circuit containing the voltmeter E. This voltmeter is preferably of a double acting type having a zero position, so that readings may be taken regardless of the arrangement of terminals with which the prods are engaged. The voltmeter is also mechanically supported by the prods with its dial facing upward so that it may be easily read by the operator.

In use, the operator grasping the handle C in one hand can press the pointed prods into the terminals of the cells, which in discharging current through the resistor D will indicate by the voltage the condition of the cell. The operator may quickly transfer the engagement from cell to cell and as there are no flexible conductors or connections to be made, there is nothing to delay the test.

What I claim as my invention is:

1. A battery tester, comprising a pair of prods in fixed relation to each other, a handle to which said prods are attached, and a resistor and voltmeter mounted between said prods.

2. A battery tester, comprising a pair of prods, a handle extending transversely between the upper ends of said prods and to which the latter are secured in fixed relation to each other, and a resistor and voltmeter mounted between said prods.

3. A battery tester, comprising a pair of prods, a handle extending transversely between said prods and to which they are secured in fixed relation to each other, a voltmeter arranged between the prods beneath the handle having its dial facing upward, and a resistor extending between the prods.

4. A battery testing instrument, comprising a pair of prods sharpened at their lower ends, an insulating handle extending transversely between the upper ends of said prods, a voltmeter arranged between the prods, being mechanically supported thereby and electrically connected therebetween, and a resistor also connected between the prods.

5. A battery tester comprising a pair of prods spread apart at their upper ends and inclined towards each other in a downward direction, a handle between the upper ends of said prods, a voltmeter mounted between said prods beneath said handle and in a position to be read from the top, and a resistor between said prods.

6. A battery tester comprising a pair of prods spread apart at their upper ends and inclining towards each other in a downward direction, the lower ends of said prods being sharpened and being spaced a distance convenient for engagement with battery terminals, a handle between the upper ends of said prods, holding the same in fixed relation, a voltmeter between said prods beneath said handle and in a position to be read from the top, and a resistor also between said prods.

In testimony whereof I affix my signature.

CHARLES W. TERRY.